Patented Sept. 16, 1947

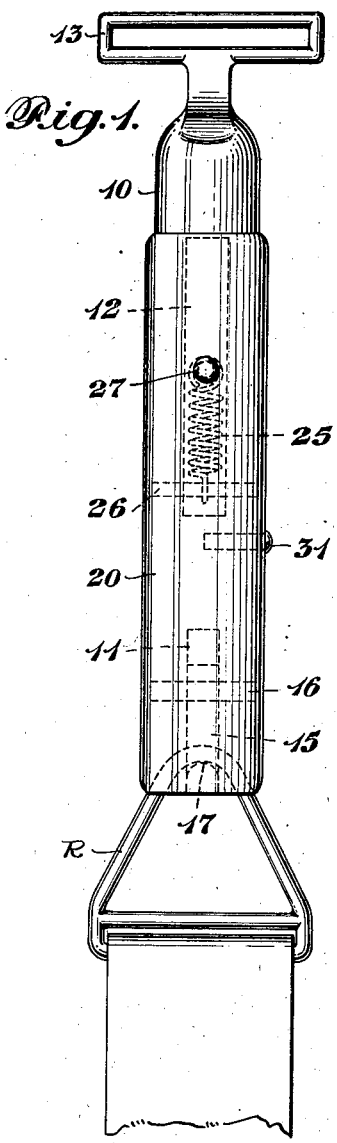
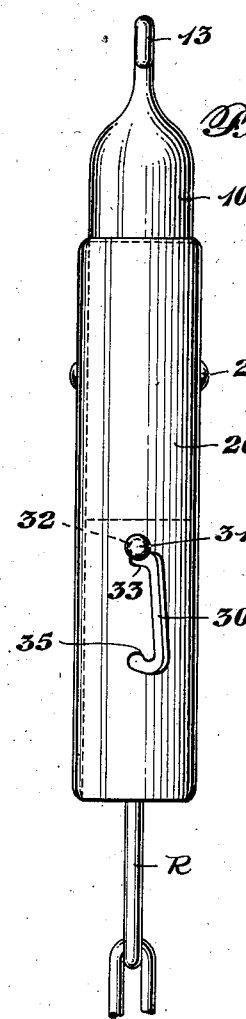
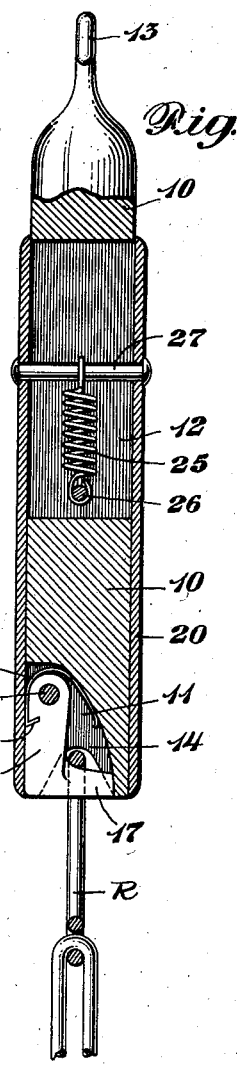
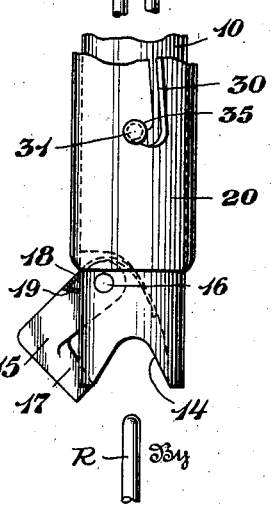

2,427,362

UNITED STATES PATENT OFFICE 2,427,362

QUICK DISCONNECT HOOK

Herman Lombard, United States Navy

Application January 23, 1945, Serial No. 574,184

3 Claims. (Cl. 294—83)

(Granted under the act of March 3, 1883, as amended April 30, 1928; 370 O. G. 757)

This invention is directed to a quick disconnect hook of general utility and deals, more particularly, with a device of this kind which is particularly suited for parachute applications such as the connection of a parachute to a parachute harness or the securing of a parachute harness on the body of a wearer.

A primary object of the invention is for the provision of a quick disconnect hook which is simple, foolproof and easily and quickly operated in a minimum of time and effort to effect an instantaneous release of the hook, particularly in situations where the parachute and/or harness must be discarded by the wearer in the quickest way and in the shortest possible time, as for example, in a landing in water or when it is difficult to spill the air from the parachute in collapsing the same to avoid being dragged thereby.

Another object of the invention is to provide a quick disconnect hook which is positively locked in its closed position in a manner whereby accidental or unintended movement of the hook to releasing position is prevented.

A further object of the invention is to provide a hook of the kind described which is of a simplified, unitary construction embodying a hand-grip quick releasing mechanism which also serves to maintain the hook in closed position and otherwise includes means providing a positive lock of the hook in such closed position.

Still another object of the invention is to provide a quick disconnect hook of this character in which the combined hand-grip and locking element is actuated by spring means to hold the hook in closed position and to provide a positive lock of the hook in such closed position.

A further object of the invention is to provide such a quick disconnect hook in which the combined hand-grip and locking means insures a positive lock of the hook in closed position and otherwise provides a relatively simple arrangement which permits release of the hook in a minimum of time and effort merely by a twist and pull on the hand-grip in any position, thereby avoiding any searching and fumbling which is required to locate a special releasing element in the form of a push-button, spring pressed tongue or the like such as is used in hook releasing arrangements of heretofore known devices.

Another object of the invention is to provide a quick-disconnect hook which incorporates all the foregoing features in a simple and compact design that is strong and durable and may be produced at comparatively low cost in that it requires only a minimum number of parts and relatively few operations in the manufacture thereof.

With such objects in view, as well as other advantages which may be incident to the use of the improvements, the invention consists of the parts and combinations thereof hereinafter set forth and claimed with the understanding that the several necessary elements constituting the same may be varied in proportions and arrangement without departing from the nature and scope of the invention as defined in the appended claims.

In order to make the invention more clearly understood there are shown in the accompanying drawings, means for carrying the invention into practical effect, without limiting the improvements in their useful application to the particular construction and arrangement which for purposes of explanation, have been made the subject of illustration.

In the drawings:

Fig. 1 is a vertical elevational view of the quick-disconnect hook of the present invention showing the hook in closed, article holding position;

Fig. 2 is a side view of Fig. 1;

Fig. 3 is a vertical sectional view of Fig. 2 showing the details of construction of the quick disconnect hook; and, Fig. 4 is a fragmentary view similar to Fig. 2 showing the hook in open or releasing position.

Referring now, more particularly, to the drawings, the quick-disconnect hook of the invention is shown comprising a generally cylindrical post or body member 10 having a recess 11 at one end, an intermediate slot 12 and an attaching means 13 at its other end. In the present example, the attaching means 13 is shown in the form of a loop for receiving a fold of webbing or the like used in a parachute harness. In other applications the attaching means 13 assumes the form of a ring or hook for attachment to a chain, cable, rope or the like. The recess 11 defines spaced tongues 14 having slotted ends and these tongues together with a pivoted latch 15 define a closure for retaining a ring R, or the like, to be attached to the quick-disconnect hook.

The latch 15 is pivotally mounted between the spaced tongues 14 by a pin 16 and is of a design in which a portion of the rear edge thereof defines a bearing surface which is substantially flush with the adjacent edges of the tongues 14 in the closed position of the latch. The lug 17 portion of the latch preferably is designed with an inclined surface extending generally downwardly in relation to said rear edge of the latch. A flat leaf spring 18, attached at one end to the latch, is bent in a manner to engage the wall of the recess 11 under compression and is thereby adapted to cause the latch, when released, to spring outwardly relatively to the tongues 14 and be maintained in this relation in the open position of the hook as shown in Fig. 4. The latch, however, is capable of ready retraction to the closed position of the hook, shown in Fig. 3, against the force of the leaf spring 18 thereby placing said spring under compression against the wall of the recess 13 and thus ready to function in a subsequent actuation of the latch to open position. The leaf spring 18 may be attached to the latch in any suitable manner as by spot welding or riveting but preferably by means of a bent lip 19 which is seated in a groove in the latch and the material adjacent said groove then peened to anchor said lip to the latch.

A tubular locking and gripping sleeve 20 is telescoped over the assembly comprising the body 10 having the latch 15 pivotally mounted thereon. Thus, as shown in Figs. 1 and 3, in the closed, holding position of the hook, the latch 15 is held in locked position by the sleeve 20 telescoped over the body 10 and engaging the rear edge of the latch 15. The attaching ring R, connected to the parachute harness, rests on the inclined surface of the lug portion 17 of the latch and extends through the end slots of the tongues 14, thereby being positively retained in the closed position of the hook.

A coil spring 25 is longitudinally disposed in the intermediate slot 12 of the body 10 and is connected at one end to a cross pin 26 driven into holes bored in the body portions adjacent said slot 12. The other end of the coil spring is connected to a cross pin 27 secured to the sleeve, and, in this relation, maintains the sleeve in the closed position of the hook against accidental or unintended displacement. The cross pin 27 is of considerably less diameter than the width of the slot 12 and thus, the sleeve 20 is capable of a certain amount of relative rotation to the body while otherwise being adapted for axial movement with respect to said body.

This relative rotation of the sleeve 20 on the body 10 is utilized in connection with a bayonet shape cutout 30 in the sleeve and cooperating pin 31 driven into the body 10 to provide a positive lock of the sleeve in the closed position of the hook. The cutout 30 defines a U-shaped recess 32 opposite an abutment 33 and thus when the pin 31 is seated in the U-shaped recess 32 the sleeve is positively locked on the body 10 in closed position against relative rotative movement by the edges of said recess 32 and against direct relative axial movement by the abutment 33. Thus the sleeve may be moved axially only by a right angle movement by which the U-shaped recess portion 32 is removed from engagement with the pin 31 and the sleeve then turned to avoid the abutment 33. The longitudinal portion of the cutout 30 then is in position to pass the pin 31 and permit the sleeve to be moved axially to the open or releasing position of the hook. In this relation, the cutout 30 is shaped to define a lower abutment 35 which, upon slight rotation of the sleeve, is engaged with the pin 31, as shown in Fig. 4, to maintain the sleeve in the open position of the hook in order to facilitate application of the hook to a ring or other part to which it is to be attached.

In any event, the attachment of the hook to a ring or the like is accomplished by grasping the sleeve 20 and moving the same axially relatively to the body 10 against the influence of the spring 25, whereupon the pin 31 is engaged with the abutment 35, if desired, to hold the sleeve in the open position of the hook, as shown in Fig. 4. In this position the sleeve 20 clears the latch 15 and this permits the latch 15 to pivot outwardly under influence of the flat spring 18. The attaching ring R or the like is then inserted into slots in the ends of the tongues 14 and the latch 15 automatically returned to closed position by the sleeve upon release of the sleeve on disengagement of the abutment 35 from the pin 31. The latch 15 and slotted tongues 14 thus define a closure for the ring R in the closed article holding position of the hook.

Return of the sleeve to the closed position of the hook is effected automatically by the spring 25. The force of the spring 25 alone is sufficient to maintain the sleeve 20 in the closed position of the hook as necessary to prevent accidental or unintended opening of the latch 15. However, a positive lock, in addition, is provided by the previously described function of the slotted recess 32 at the upper end of the cut out 30. Accordingly, on return of the sleeve to the closed position of the hook, the sleeve is rotated slightly as necessary to seat the pin in said recess 32, preferably under a small force exerted by a slight tension of the spring 25 on the sleeve in this position.

The latch thus is not only positively locked in the closed position of the hook but otherwise is positively retained by the sleeve 20 under influence of the coil spring 25. The spring readily yields, however, under pull as necessary for the sleeve to move relatively to pin 31, as previously described, to the extent required to clear the latch 15 as shown in Fig. 4, whereupon the latch is free to pivot outwardly to release the ring R or other object attached to the hook. This action is automatically effected by the flat spring 18 in conjunction with load on the ring R which, accordingly, acts on the inclined surface on the lug portion 17 of the latch in the manner of a cam to cause the latch to move to open or releasing position most expeditiously.

An important advantage of the present invention resides in the compact construction of the hook in which there are no materially projecting parts and the elements of the device are more or less encased within the locking sleeve 20 and thereby protected against damage or possible fouling which could cause an accidental or unintended release of the hook.

While the invention has been described with reference to its use as a quick disconnect hook for parachutes and the like, it will be quite apparent that the design of the hook is one of general utility which is adapted for a wide range and variety of uses in other devices or applications.

It will be understood, further, that the foregoing description and accompanying drawings comprehend only the general and preferred embodiments of the invention and that various changes in the construction, proportion, arrangement and general combination of parts may be made without departing from the spirit and scope of the invention. The present embodiments are therefore to be considered in all respects as illustrative and not restrictive, the scope of the invention being indicated by the appended claims rather than by the foregoing description with all changes falling within the scope, meaning and range of equivalency of the claims intended to be embraced therein.

The invention described herein may be manufactured and used by or for the Government of the United States of America for governmental purposes without the payment of any royalties thereon or therefor.

What is claimed is:

1. A quick disconnect hook comprising a body having an opening intermediate its ends and spaced tongues at one end thereof, a latch pivotally mounted between said tongues defining a closure with the tongues in the closed position of the hook, a sleeve slidably telescoped over said body and locking the latch in said closed position, spaced cross pins extending across the opening in said body, one of said cross pins being attached to said sleeve and the other attached to said body, a coil spring in said opening in the body connected at its ends to said spaced cross pins and exerting a constant pull on said sleeve to maintain the sleeve in locking relation to the latch in closed position, and resilient means carried by the latch for holding the latch in open position when the sleeve is moved from locking relation therewith.

2. A quick disconnect hook comprising a body having an opening intermediate its ends and spaced tongues at one end thereof, a latch pivotally mounted between said tongues, a sleeve slidably telescoped over said body and locking the latch in closed position, a cross pin extending across the opening in said body and being attached to said sleeve, and a coil spring in the opening in said body connected at one end to said cross pin and at the other end to said body and exerting a constant pull on said sleeve to maintain the sleeve in locking relation to the latch in closed position.

3. A quick disconnect hook comprising a body having an opening intermediate its ends and spaced tongues at one end thereof, a latch pivotally mounted between said tongues, a sleeve slidably telescoped over said body and locking the latch in closed position, spaced cross pins extending across the opening in said body, one of said cross pins being attached to said sleeve and the other attached to said body, and a coil spring in said opening in the body connected at its ends to said spaced cross pins and exerting a constant pull on said sleeve to maintain the sleeve in locking relation to the latch in closed position.

HERMAN LOMBARD.

REFERENCES CITED

The following references are of record in the file of this patent:

UNITED STATES PATENTS

| Number | Name | Date |
|---|---|---|
| 967,486 | Avery | Aug. 16, 1910 |
| 1,485,747 | Warner | Mar. 4, 1924 |
| 2,328,914 | Kubat | Sept. 7, 1943 |

FOREIGN PATENTS

| Number | Country | Date |
|---|---|---|
| 681,146 | Germany | Sept. 15, 1939 |
| 143,405 | Great Britain | 1920 |